(12) United States Patent
De La Salle et al.

(10) Patent No.: US 7,035,727 B2
(45) Date of Patent: Apr. 25, 2006

(54) APPARATUS AND METHOD OF CONTROLLING VEHICLE CREEP CONTROL UNDER BRAKING

(75) Inventors: Stephen De La Salle, Chelmsford (GB); Mathew Breton, Westland, MI (US); Rongjun Zhang, Santa Rosa, CA (US); Michael Larsen, San Diego, CA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 464 days.

(21) Appl. No.: 10/157,162

(22) Filed: May 29, 2002

(65) Prior Publication Data

US 2003/0225501 A1 Dec. 4, 2003

(51) Int. Cl.
*B60K 31/00* (2006.01)

(52) U.S. Cl. ............................. 701/93; 701/83; 701/94; 477/40; 477/114; 477/170

(58) Field of Classification Search ................... 701/93, 701/83, 78, 87, 67, 70, 94; 477/114, 107, 477/110, 143, 40, 170, 172; 475/120
See application file for complete search history.

(56) References Cited

U.S. PATENT DOCUMENTS

| | | | |
|---|---|---|---|
| 3,645,352 A | * | 2/1972 | Stark et al. ................. 180/271 |
| 4,961,146 A | | 10/1990 | Kajiwara |
| 4,969,103 A | * | 11/1990 | Maekawa .................... 701/96 |
| 5,215,159 A | | 6/1993 | Nishida |
| 5,577,812 A | | 11/1996 | Hirano et al. |
| 5,613,743 A | | 3/1997 | Kost et al. |
| 5,703,776 A | | 12/1997 | Soung |
| 5,863,277 A | | 1/1999 | Melbourne |
| 6,023,648 A | | 2/2000 | Murasugi et al. |
| 6,089,677 A | | 7/2000 | Fukumura et al. |
| 6,146,308 A | | 11/2000 | Taniguchi et al. |
| 6,174,261 B1 | | 1/2001 | Watanabe et al. |
| 6,216,075 B1 | | 4/2001 | Speicher et al. |
| 6,253,144 B1 | | 6/2001 | Yamamura et al. |
| 6,312,357 B1 | | 11/2001 | Sakai et al. |

FOREIGN PATENT DOCUMENTS

JP 11299006 A 10/1999
JP 2000102113 A 4/2000

OTHER PUBLICATIONS

Search Report for Application No. GB 0307768.2 sent Sep. 2, 2003.

* cited by examiner

*Primary Examiner*—Thomas G. Black
*Assistant Examiner*—Arthur D. Donnelly
(74) *Attorney, Agent, or Firm*—Brinks Hofer Gilson & Lione

(57) ABSTRACT

The present invention provides in one embodiment a method for controlling vehicle creep control. Measurements are received from a brake pedal sensor, where the measurements are indicative of a brake pedal travel. A target creep speed value is derived based on the measurements of creep speed and the brake pedal travel. A request for wheel torque is derived based on the target creep speed. There is a determination of the difference between a measurement of vehicle creep speed and the target creep speed value. The request for wheel torque is adjusted, if the target creep speed is not equivalent to the vehicle creep speed.

23 Claims, 9 Drawing Sheets

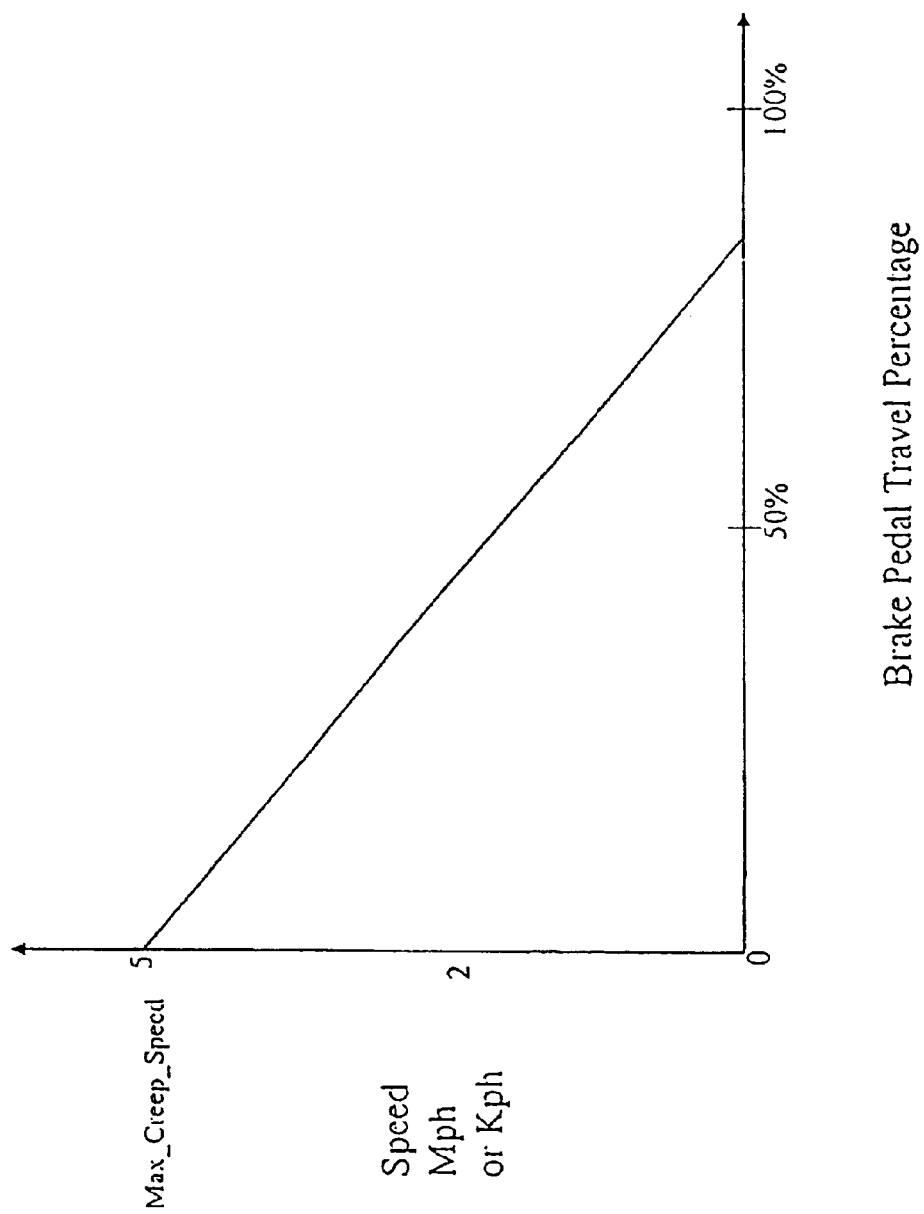

APPARATUS AND METHOD OF CONTROLLING VEHICLE CREEP CONTROL UNDER BRAKING

BACKGROUND OF THE INVENTION

Typically, vehicles include creep control devices, which maintain a constant speed of a vehicle when the vehicle is operating at low speeds. When the vehicle is in a drive mode, a driver may automatically initiate the utilization of the creep control device to move the vehicle in a creep mode or a creep-like manner by not depressing the brake pedal and the accelerator pedal allowing the vehicle to move at a low speed. Creep mode may also be initiated by the driver activating a switch or like device in the vehicle.

The utilization of creep control devices is especially advantageous when traveling in congested traffic for long periods of time, when parking a vehicle in a garage, or when passing another vehicle along a narrow road. A typical creep control device is disclosed in a Japanese Published Unexamined Patent Application No. 61-247525, where the creep control device or a control unit adjusts the degree of opening of a throttle value to maintain a constant, predetermined vehicle speed as long as the accelerator pedal is depressed. When the control unit is performing creep control, the vehicle speed is independent of the amount of depression of the accelerator pedal. As the driver removes his foot from the accelerator pedal, the control unit automatically applies the brakes and stops the vehicle.

The problem with this typical creep control unit is that the driver cannot freely control the creep speed, which is preset at the factory. Another problem associated with this unit is that it does not take into account various factors, such as weather conditions, the road level, any problems the car may have that may effect the level of creep speed the vehicle may require.

BRIEF SUMMARY OF THE INVENTION

The present invention provides in one embodiment a method for controlling vehicle creep control. Measurements are received from a brake pedal sensor, where the measurements are indicative of a brake pedal travel. A target creep speed value is derived based on the measurements of creep speed and the brake pedal travel. A request for wheel torque is derived based on the target creep speed. There is a determination of the difference between a measurement of vehicle creep speed and the target creep speed value. The request for wheel torque is adjusted, if the target creep speed is not equivalent to the vehicle creep speed.

In another embodiment of the invention, there is a method for controlling vehicle creep control. Measurements are received from a brake pedal sensor, where the measurements are indicative of a brake pedal travel. A target creep speed value is derived based on the measurements of creep speed and the brake pedal travel. A request for wheel power is derived based on the target creep speed. There is a determination of the difference between a measurement of vehicle creep speed and the target creep speed value. The request for wheel power is adjusted, if the target creep speed is not equivalent to the vehicle creep speed.

In yet another embodiment of the invention, there is a system for controlling creep speed in a vehicle. A plurality of wheels in the vehicle are operatively connected to a transmission. An engine is operatively connected to the transmission. A controller is operatively connected to the engine, wherein the controller receives measurements from a brake pedal in the vehicle and a speedometer of the vehicle, wherein the controller compares the measurements with a software program, and based on the measurements and the software program requests wheel torque to be applied to the plurality of wheels.

In another embodiment of the invention, there is an apparatus for controlling vehicle creep control. Measurements from a brake pedal sensor are received at a receiving means, where the measurements are indicative of a brake pedal travel. Means are utilized for deriving a target creep speed value based on the measurements of creep speed and the brake pedal travel. A request for wheel torque is derived based on the target speed. Means are utilized for determining if there is a difference between a measurement of vehicle creep speed and the target creep speed value. The request for wheel torque is adjusted by the adjusting means, if the target creep speed is not equivalent to the vehicle creep speed.

In yet another embodiment of the invention, there is an apparatus for controlling vehicle creep. A controller is configured to receive measurements from a brake pedal, and an accelerator pedal of the vehicle, where the controller compares the measurements with a software program and based on the measurements and the software program requests wheel torque be applied to a plurality of wheels.

BRIEF DESCRIPTION OF THE DRAWINGS

These and other advantages of the present invention that will become more fully apparent as the following description is read in conjunction with the accompanying drawings, wherein:

FIG. 2b, depicts a graphical illustration brake pedal travel as it relates to creep speed according to the preferred embodiment of the invention;

DETAILED DESCRIPTION OF THE INVENTION

While traditional automotive electrical systems utilize a 14-volt power architecture, a new generation of vehicle electrical systems have switched to a 42-volt electrical systems, tripling existing vehicle voltage for both battery output (12 volts to 36 volts) and generator output (14-volt to 42-volt). The 42-volt stand and has made possible the development and integration of additional technologies for vehicles, including an integrated starter generator that combines a starter motor and a generator function in one device.

Figure 1A:
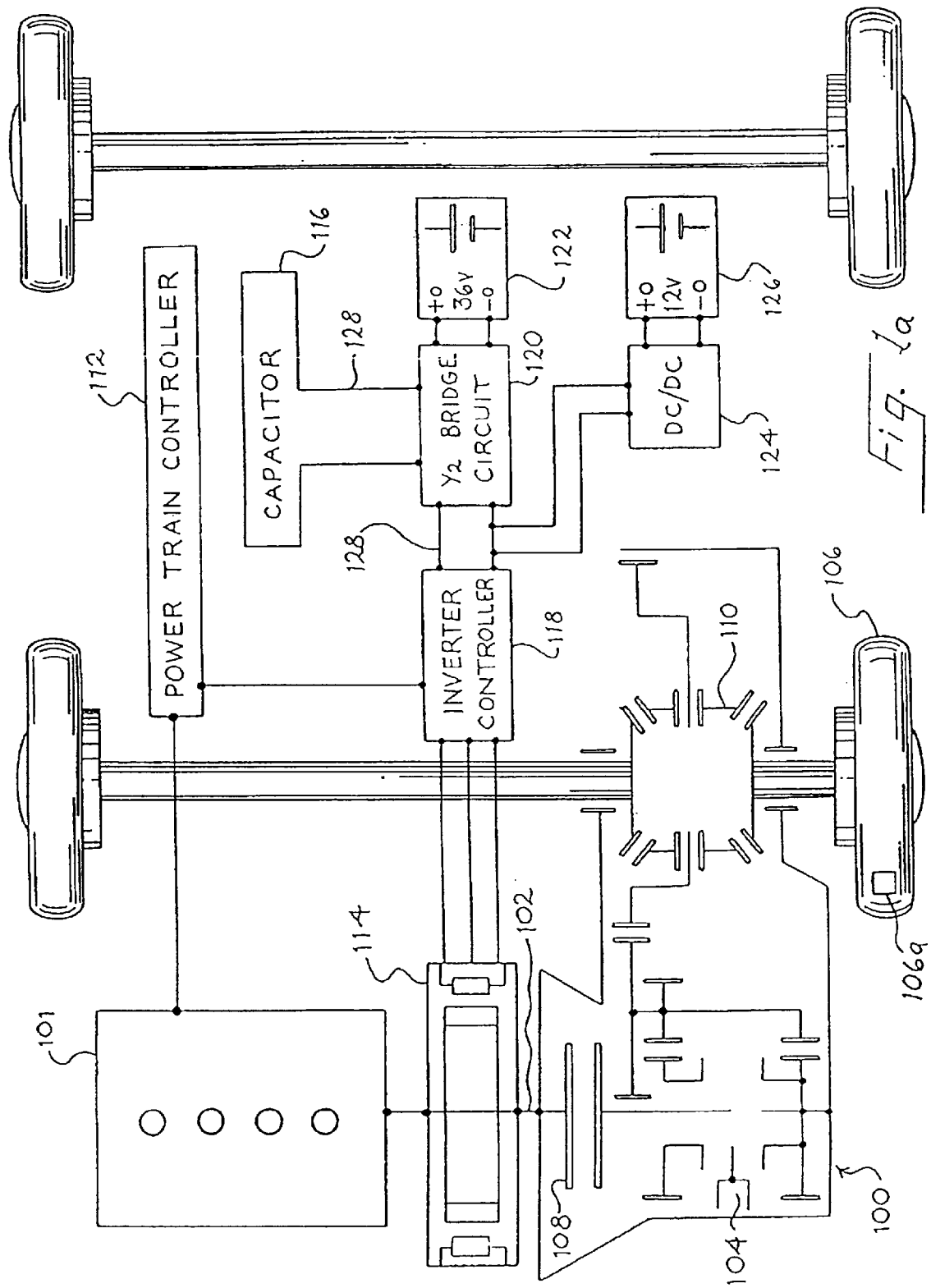
FIG. 1a depicts a block diagram of a vehicle system according to the preferred embodiment of the invention.

Referring now to the drawings, FIG. 1a is a schematic block diagram showing an overall vehicle system 100 utilizing a preferred embodiment of the present invention. The vehicle system 100 includes an engine 101 with an engine crankshaft 102, a transmission 104, a set of drive wheels 106, a coupling device 108, a differential gear mechanism 110, a powertrain microcontroller 112, an integrated starter generator (ISG) 114, a capacitor bank 116, an inverter controller 118, a half bridge circuit 120, a 36 volt primary battery 122, a DC to DC converter 124, a second battery 126 and an inverter bus 128. The engine crankshaft 102 is coupled to the transmission 104 via the coupling device 108. The set of drive wheels 106 may be referred to as a plurality of wheels that includes wheel sensor 106a. Powertrain microcontroller 112 may be referred to as powercontroller 112 or controller 112.

The inverter bus 128 operatively connects or electrically connects the ISG 114 to the inverter controller 118. Next, inverter controller 118 is operatively connected to the half bridge circuit 120. Capacitor bank 116 is also operatively connected to the half bridge circuit 120. Primary battery 122, in turn, is operatively connected to the half bridge circuit 120, as shown.

Engine 101 may be a conventional internal combustion engine disconnectably coupled to a manual transmission via a clutch mechanism or fluidly coupled to an automatic transmission via a torque converter. The transmission 104 is operatively connected to the drive wheels 106 through a differential gear mechanism 110 for transmitting the driving torque produced by the engine 101 to the drive wheels 106, as is well known in the art. A powertrain controller 112 is operatively connected to the engine 101. In addition, powertrain controller 112, preferably, controls the operation of the engine 101.

The integrated starter generator (ISG) 114 can function either as an electric motor or as a generator that generates AC electric power for sourcing electric loads. The ISG 114 includes a stator having a winding that is bolted between the bell housing of the engine 101 and the transmission 104. Accordingly, the ISG 114 in a motoring mode may be energized to crank the vehicle engine 101 similar to a conventional electric motor before fueling of the engine begins to assist the torque output of the engine 101 after the engine is started.

Figure 1B:
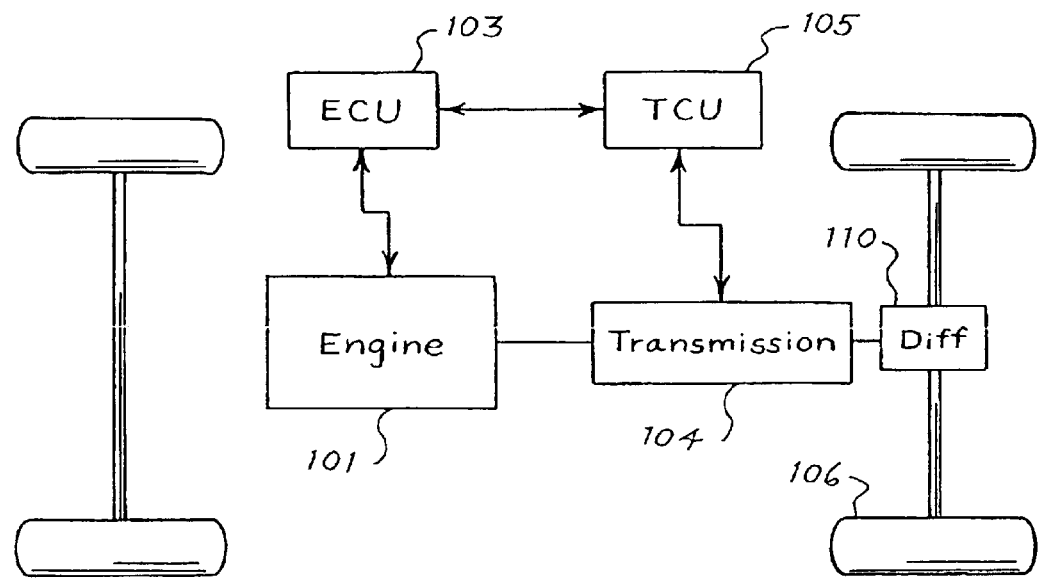
FIG. 1b depicts a block diagram of a conventional vehicle system with an engine control unit and a transmission control unit according to the preferred embodiment of the invention.

In FIG. 1b, there is a depiction of a block diagram of a conventional vehicle system with an engine control unit and a transmission control unit according to the preferred embodiment of the invention. In this embodiment, the vehicle system includes an engine control unit (ECU) 103, engine 101, a transmission control unit (TCU) 105, transmission 104, the plurality of wheels 106 and differential gear mechanism 110. ECU 103 is used in place of powertrain controller 112 to control engine 101 and TCU 105. Engine 101 is operatively connected to transmission 104. TCU 105 is operatively connected to transmission 104. TCU 105 is operatively connected to 105. Transmission 104 is operatively connected to the plurality of wheels 106 through a differential gear mechanism 110 for transmitting the driving torque produced by the engine 101 to the plurality of wheels 106, as is well known in the art.

Figure 1C:
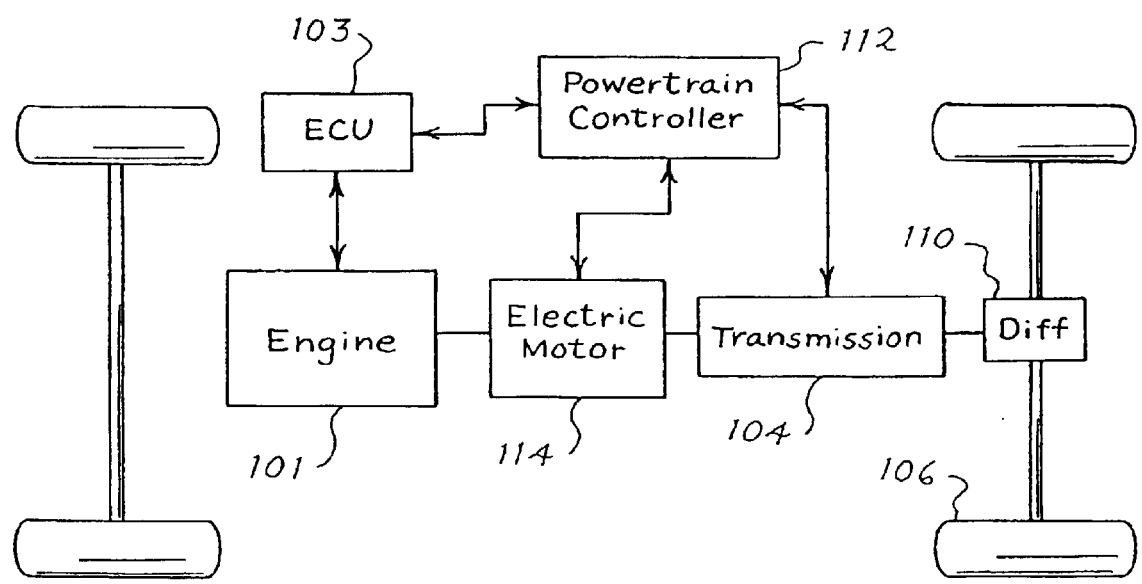
FIG. 1c depicts a block diagram of a parallel hybrid vehicle system with an engine control unit according to the preferred embodiment of the invention.

In FIG. 1c, there is a depiction of a parallel hybrid vehicle system with an engine control unit according to the preferred embodiment of the invention. The hybrid vehicle utilized in this invention may be a pre-transmission hybrid or a post-transmission hybrid. A pre-transmission hybrid has the traction electric motor/generator located on the engine side of the transmission. A post-transmission hybrid has the traction electric motor/generator located on the axle/half-shaft (or wheel) side of the transmission. The location of the traction electric motor affects some aspects of hybrid control (such as engine-starting, reverse operation, etc), but does not directly affect this particular portion of the control strategy.

In this embodiment, the vehicle system includes the engine control unit (ECU) 103, an engine 101, the transmission 104, the plurality of wheels 106, the powertrain controller 112, the electric motor 114 and the differential gear mechanism 110. In this embodiment, powertrain controller 112 is utilized in place of TCU 105, where the powertrain controller is operatively connected to the ECU 103, electric motor 114 and the transmission 104. Powertrain controller 112 controls engine 101 through ECU 103. Powertrain controller 112 also controls electric motor 114 and transmission 104. Differential gear mechanism 110 is utilized in the same way by transmission 104 as described above.

Figure 1D:
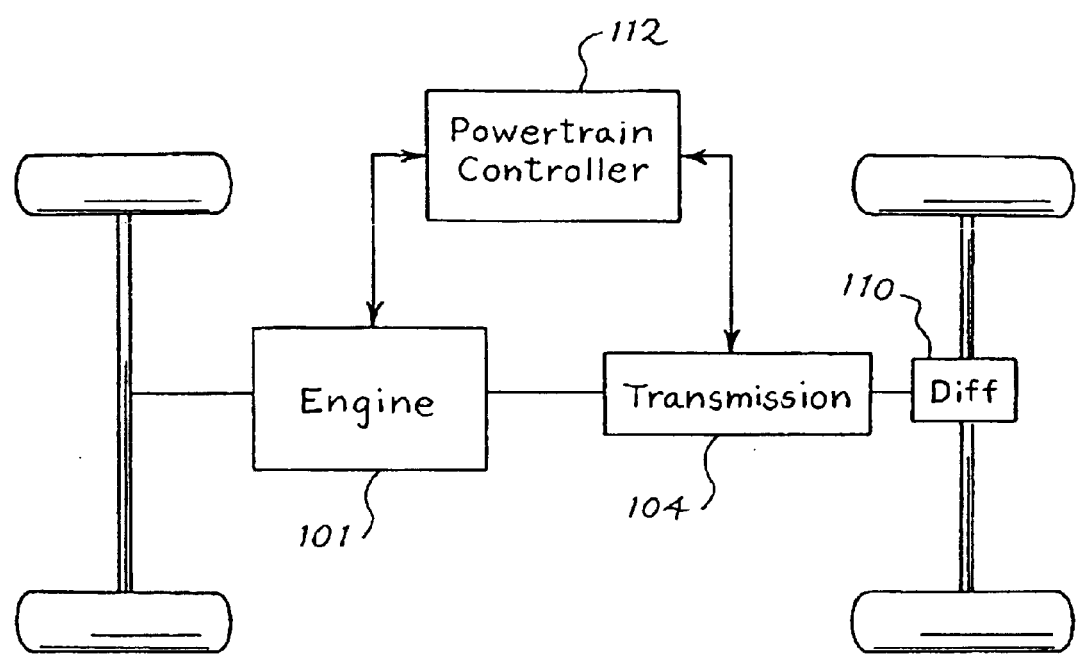
FIG. 1d depicts a block diagram of a conventional vehicle system according to the preferred embodiment of the invention.

In FIG. 1d, there is a depiction of a conventional vehicle system according to the preferred embodiment of the invention. This embodiment is similar to the vehicle system of FIG. 1c, however, this figure does not include ECU 103 and electric motor 114. Powertrain controller 112 is in direct control of engine 101 and transmission 104.

Figure 1E:
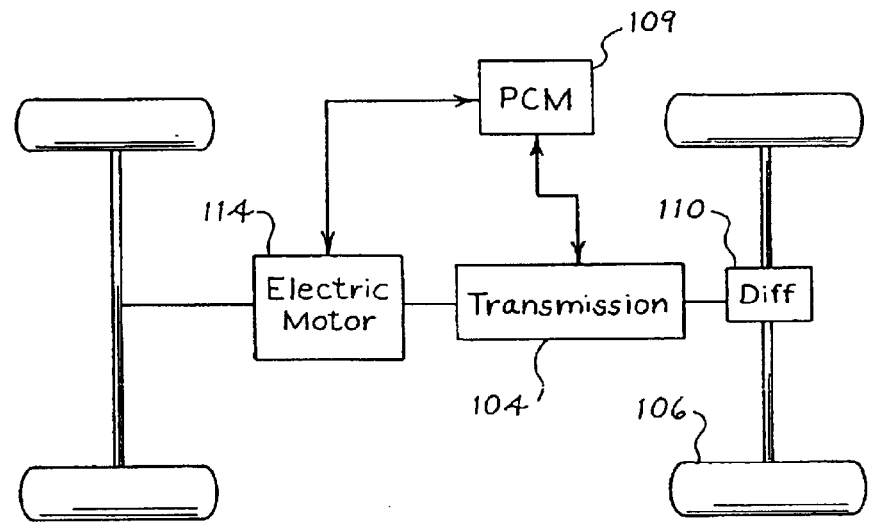
FIG. 1e depicts a block diagram of a serial hybrid vehicle system according to the preferred embodiment of the invention.

In FIG. 1e, there is a depiction of a serial hybrid vehicle system according to a preferred embodiment of the invention. This embodiment is similar to the vehicle system of FIG. 1c, however, there is no engine 101 and ECU 103. In addition, the powercontroller 112 is replaced with a power control module (PCM) 109 that is an engine and transmission control in one module. PCM 109 is utilized to control electric motor 114 and transmission 104.

Figure 1F:
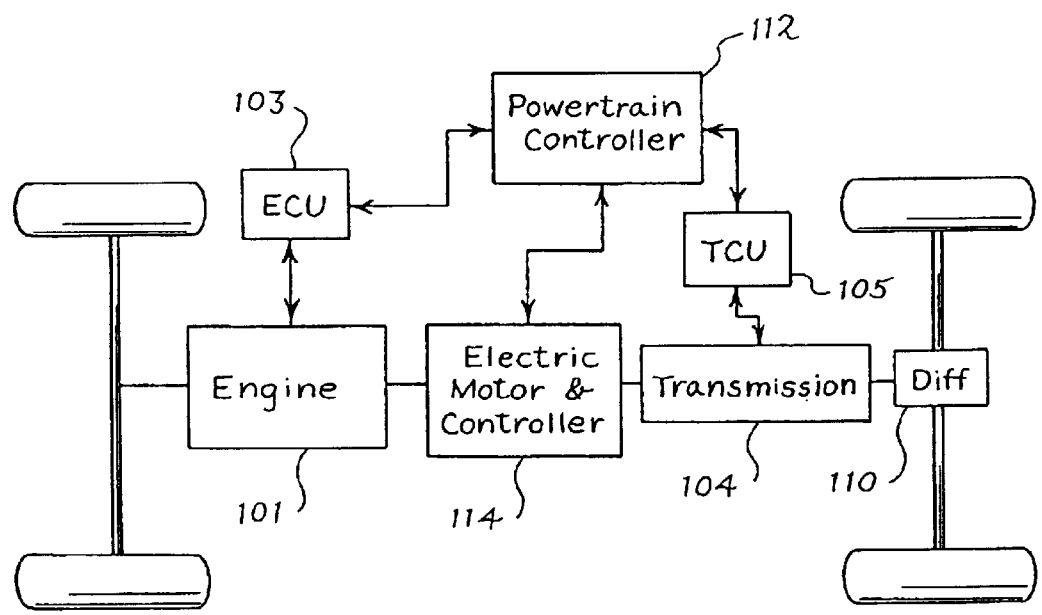
FIG. 1f depicts a block diagram of a parallel hybrid with an engine control unit and a transmission control unit.

In FIG. 1f, there is a depiction of a parallel hybrid vehicle with an engine control unit and a transmission control unit. This embodiment is similar to the vehicle system of FIG. 1c, however, this figure also includes the TCU 105 located between powertrain controller 112 and transmission 104. Powertrainer controller 112 through TCU 105 is able to control transmission 104. Powertrain controller 112 is operatively connected to TCU 105. TCU 105 is operatively connected to transmission 104.

Figure 2A:
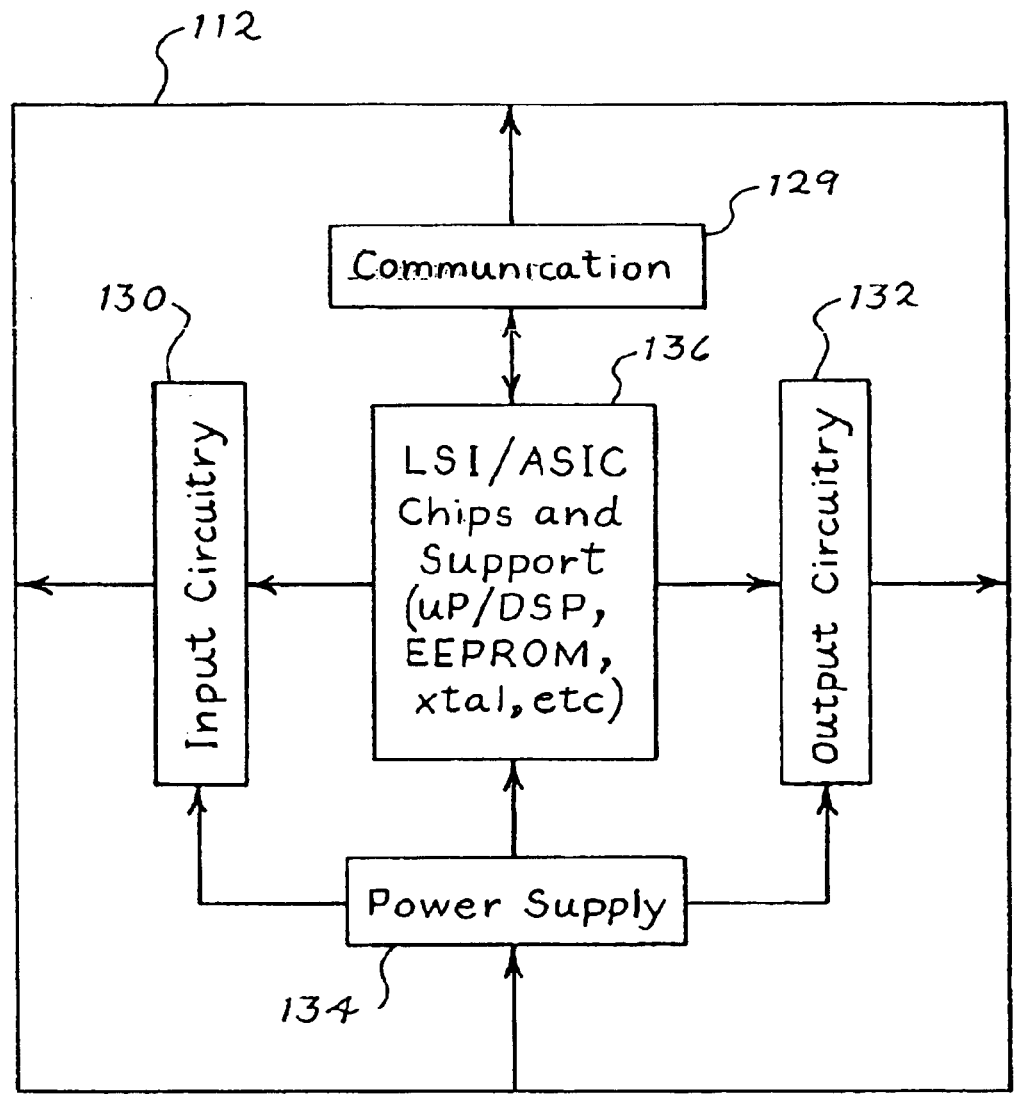
FIG. 2a depicts a powertrain controller according to the preferred embodiment of the invention.

Referring to FIG. 2a, there is a depiction of a typical powertrain controller 112. The powertrain controller consists of an input circuitry 130, an output circuitry 132, a power supply 134, a communication circuit(s) 129, and a Very Large Scale Integrated (VLSI)/Application Specific Integrated Circuit (ASIC) chipset 136. An ASIC chip is a custom designed chip utilized for specific application or purposes, such as a chip designed to analyze spark signals.

Controller 112 may be used to determine and send commands to separate motor and engine 101 controllers, or it may incorporate one or both internally. The Input Circuitry 130 is responsible for signal conditioning of the electrical inputs from various sensors such as vehicle speed and brake pedal position. The Input Circuitry 130 also performs other functions such as protection of the VLSI/ASIC chipset 136 and identification of malfunctioning components and sensors.

The Output Circuitry 132 is responsible for taking the digital commands of the VLSI/ASIC chipset 136, and putting it into a form capable of commanding the various actuators employed by the controller 112. There are many types of actuators that may be used in this invention, such as an exhaust gas recirculation valve, a throttle actuator, an idle air bypass valve actuator, a spark plug coil driver, a fuel injector driver, a secondary air valve, an intake manifold runner adjuster, an electromagnetic valve, a glow plug, a turbo charge wastegate, a vapor management valve, a transmission solenoid driver, an exhaust gas oxygen sensor heater, an alternator voltage setpoint, a fuel pump, an engine fan, a canister purge valve, battery interlocks and malfunction indicator lights. The Output Circuitry 132 also monitors the actions of the actuators for fault conditions in the wiring or actuators.

The Power Supply 134 provides the various voltages required by the other components in the controller 112, as well as providing power for some of the sensors and actuators. The VLSI/ASIC chipset 136 may include a microprocessor, micro-controller, or digital signal processor, electronic erasable program read only memory (EEPROM) or Flash memory, static random access memory (RAM), a clocking/timing circuit, or any typical processor utilized in an electrical device, as well as custom ASIC chips specifically designed to perform various functions such as analog processing or spark control. The VLSI/ASIC chipset 136 may also simultaneously directly control various components of a vehicle system, such as the transmission, fuel system, speedometer, electronic throttle control, speed control, spark plugs, fuel injectors, fans and battery charging.

VLSI/ASIC chipset 136 also includes a software program that allows VLSI/ASIC 136 to continuously monitor and read measurements from the input circuitry 130 connected to various systems, sensors and components. The components include a brake pedal, accelerator pedal and a vehicle speedometer. Alternatively, VLSI/ASIC chipset 136 receive the measurement via communication from other modules, such as engine control unit 103 or power control module 109. These measurements have values indicative of the amount of depression of the brake pedal or brake pedal travel, depression of the accelerator pedal and speed and other physical phenomena. The sensor measurements from the vehicle speedometer and accelerator pedal include measurements from a wheel speed sensor and/or shaft speed sensor. Speed may be measured in miles per hour or kilometers per hour or any measurement related to speed. VLSI/ASIC chipset 136 utilizes the software program to transmit commands through the actuators to engine 101 and/or electric motor to provide wheel torque or wheel power through transmission 104 to the plurality of wheels 106. The command for torque may be sent from controller 112, ECU 103 or power control module 109 directly to the actuators on these devices that produce the torque, depending on the vehicle electrical architecture.

In FIG. 2b, there is a graphical illustration of brake pedal percentage travel as it relates to creep speed. This graphical illustration illustrates measurements of creep speed in miles per hour (mph) or kilometers per hour (kph) versus brake pedal travel percentage that is included in the software program of VLSI/ASIC chipset 136. Brake pedal travel percentage represents an amount of force utilized by a person to depress the brake pedal. For example, when a person is operating a vehicle in a drive mode and the person barely depresses the brake pedal, then the brake pedal percentage travel may be at or close to zero percent. In another example, if the person fully depresses the brake pedal, then the brake pedal percentage may be at or close to one hundred percent.

A person may initiate a creep operating mode in a vehicle by depressing the brake pedal in the vehicle, then the creep speed will be at a calibrated level (referred to as MAX_CREEP_SPEED) while the brake pedal travel percentage is at a lower level. As a response to the creep speed or a speed that represents a proper feel for the driver, the brake pedal travel percentage is zero on the X axis. As the person continues to depress the pedal, the creep speed decreases to a lower level or a calibrated level while the brake pedal travel increases. Before the person has fully depressed the brake pedal, the creep speed decreases to zero miles per hour and will remain at zero as brake pedal travel increases to one hundred percent.

Referring to FIG. 2a, the VLSI/ASIC chipset 136 utilizes the software program to compare the values it receives from the sensors and uses these values with algorithms executed by the VLSI/ASIC chipset 136 to perform various functions described later. The sensors may be located on the brake pedal, the accelerator pedal, the speedometer, shaft speed and the wheel sensor 106a.

Figure 4:
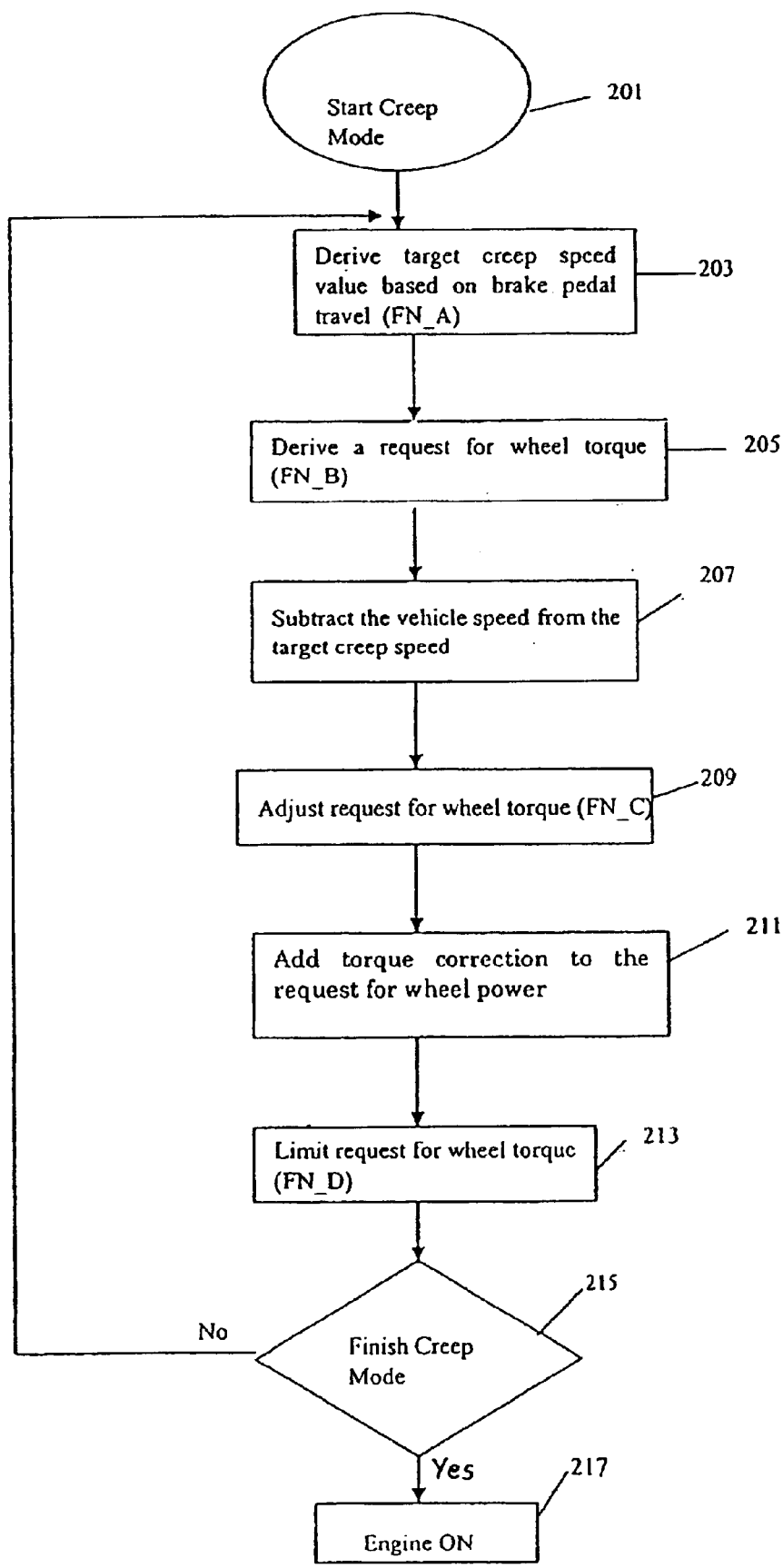
FIG. 4 depicts a flow chart according to the preferred embodiment of the invention.

Referring to FIG. 4, there is a flow chart that depicts the preferred embodiment of this invention. In 201, an operator of a vehicle may choose to initiate the creep mode of the vehicle. When the vehicle is being driven the creep mode may be initiated by the operator depressing a brake pedal of the vehicle, then the operator may slowly lift his foot from the brake pedal causing the vehicle to move in a slow manner or in the creep mode.

Alternatively, the creep mode may be automatically initiated by the other logic within the controller 112. For example, the vehicle may be equipped with a creep mode mechanism that allows it to be initiated when the drive mode of the vehicle is at a certain speed. Those of ordinary skill in the art know there are a variety of means to initiate the creep mode in a vehicle that may be utilized by this invention. A necessary precondition in all creep mode implementations is that the operator can not depress the accelerator pedal of the vehicle.

Figure 3:
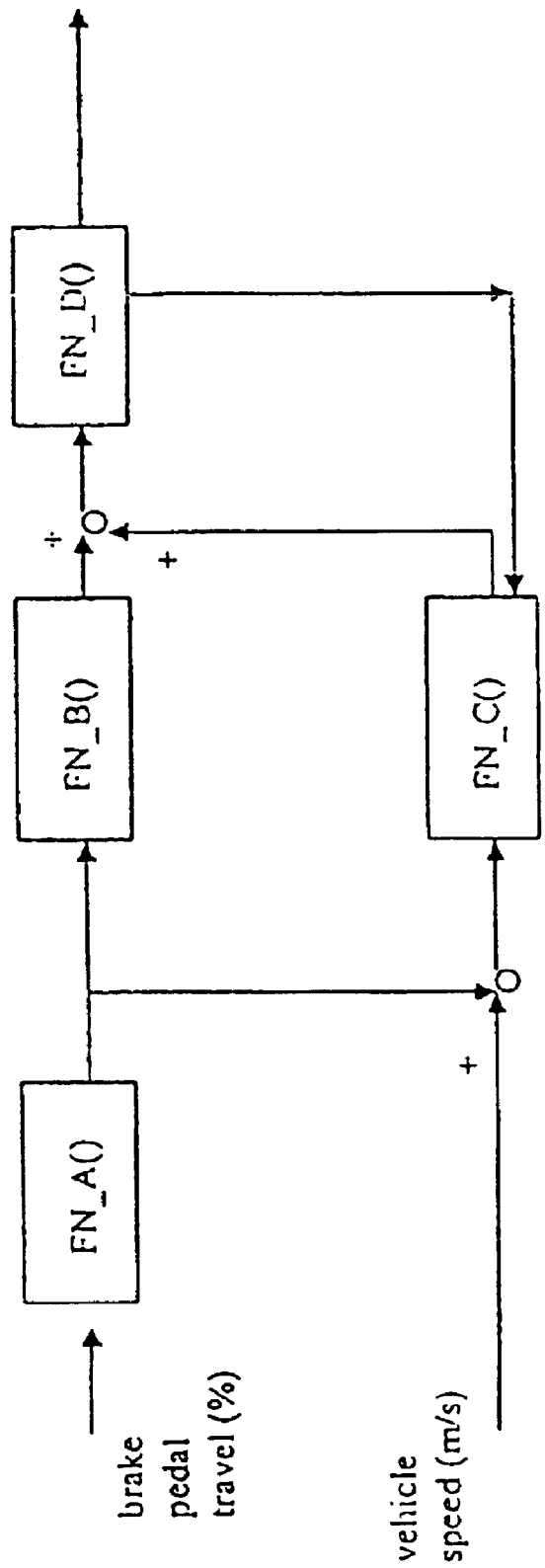
FIG. 3 depicts a block diagram of a calculation of creep control by the powertrain controller according to the preferred embodiment of the invention.

In 203, controller 112 receives measurement from the sensor or transducer on the brake pedal through the input circuitry 130. The measurements provide an indication of brake pedal travel. The brake pedal travel relates to the amount of depression or force the operator exerts on the brake pedal, which relates to the brake pedal and the position of the brake pedal. Referring to FIG. 2a and FIG. 3, based on the brake pedal travel percentage and the software program of VLSI/ASIC chipset 136, VLSI/ASIC 136 utilizes the measurements in the software program of creep speed and brake pedal travel percentage to match the brake pedal travel percentage with a creep speed to derive a target creep speed value or reference creep speed value. For example, if the operator lightly depresses the brake pedal, then the brake pedal travel percentage may be zero percent and the target creep speed may be five miles per hour (mph) or kilometers per hour (kph) as shown in FIG. 2b. Alternatively, the brake pedal travel and the associated reference creep speed may be a calibrated function or value that is dependent on the type of vehicle the operator is driving.

In 205, a request for wheel torque or wheel power value is derived by utilizing the software program of VLSI/ASIC chipset 136. VLSI/ASIC chipset 136 translates the target creep speed to the request for wheel torque, then the request is transmitted through the actuators to the engine 101 and/or electric motor 114. Engine 101 and/or motor 114 transmit the request through transmission 104. Transmission 104 receives the request, then increase or supplies wheel torque to the plurality of wheels 106. The phrase "wheel torque" may be used interchangeably with the phrase "wheel power." VLSI/ASIC chipset 136 may utilize a look up table, a calibration technique or a formula to obtain the requested wheel torque. VLSI/ASIC chipset 136 may utilize a look up table that includes the target creep speed that is matched with a value for a request of wheel torque that should be transmitted to the wheels 106.

Alternatively, VLSI/ASIC chipset 136 may include a formula that utilizes the target creep speed to calculate the request for wheel torque. Those of ordinary skill in the art recognize that the target creep speed may be utilized in different ways to calculate the appropriate power or torque that should be transmitted to the wheels 106.

In 207, after the request for wheel torque is made based on the reference creep speed, then the controller 112 receives measurements from the sensor or transducer of the accelerator pedal or the speedometer indicative of vehicle creep speed or vehicle speed. VLSI/ASIC chipset 136 subtracts the measurements indicative of the vehicle speed from the reference creep speed to determine if there is a difference between the actual vehicle creep speed and the reference creep speed.

In 209, based on the difference between the vehicle speed measurements and reference creep speed, there may be an error signal. If there is an error signal, then the request for wheel power in 203 must be adjusted to correct the error signal. VLSI/ASIC chipset 136 uses a control method to calculate a torque correction that corrects the error signal. The control method may be a Proportional Integrative Derivative (PID) controller (or P, PD, PI). Alternatively, other control methods or algorithms may be used by this invention, which are known to those of ordinary skill in the art include: sliding mode algorithms, phase advance algorithms, phase lag algorithms, lead-lag algorithms, observer based algorithms, model reference adaptive algorithms, self tuning algorithms, fuzzy logic algorithms or another recognized method of calculating the torque correction using feedback. In order to calculate the correction or controller output signal of the PID controller, the following equation is used:

$$u(t)=Kp*e(t)+Ki*\text{'Time Integral of } e(t)\text{'}+Kd*\text{'Time Derivative of } e(t)$$

Kp, Ki & Kd are proportional, integral and derivative gain parameters respectively that are initially calibrated. These gain parameters may also be fixed scaler, functions, tables or the outputs of algebraic functions. The parameter e(t) is the controller input, or error signal, as a function of time as given by the difference between the reference signal value and the measured signal value. In this example, the reference signal value is the reference creep speed and the measured signal value is the measured vehicle speed. The parameter u(t) is the controller output signal corresponding to the delta in torque or power required to drive the vehicle to the reference creep speed or target creep speed.

Figure 5A:
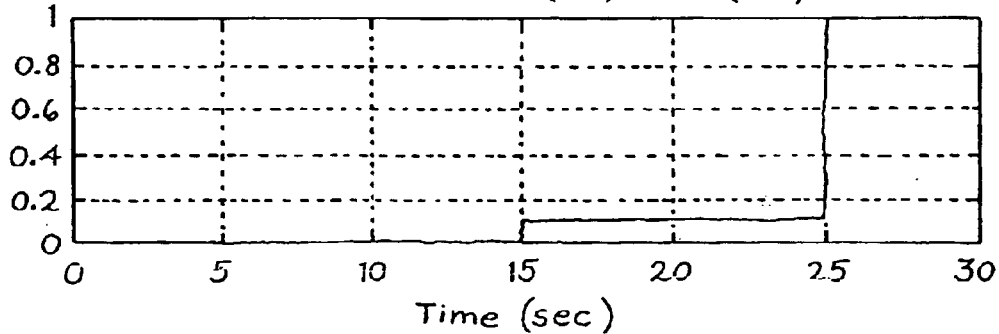
FIGS. 5a–5c depict a graphical illustration of target speed, creep speed, brake pedal position as they relate to time and a PID controller control method.
Figure 5B:
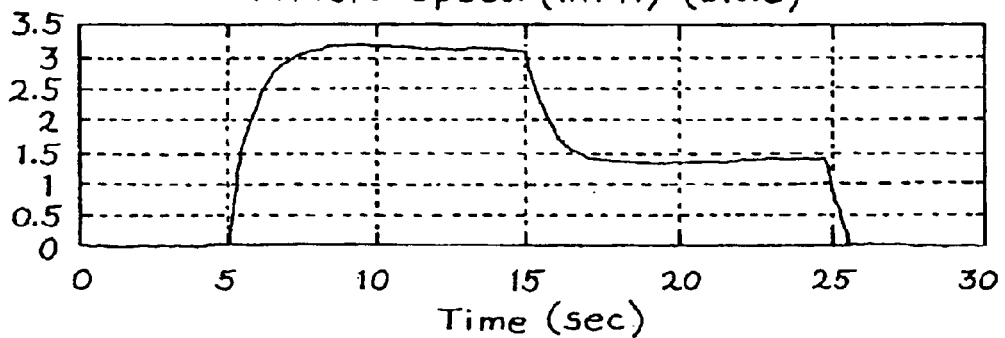
Figure 5C:
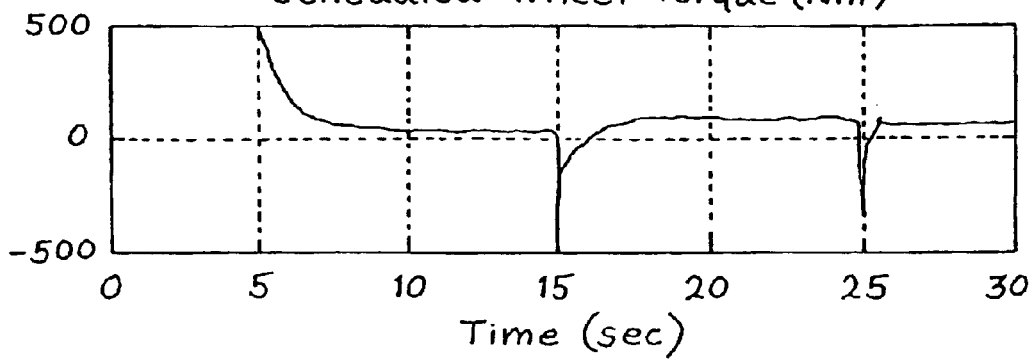

Referring to FIGS. 5a–5c there is a graphical illustration of target speed, creep speed, brake pedal position as they relate to time and a PID controller control method. In this illustration, the parameter gain values utilized for the PID controller are as follows: Kp=200, Ki=25 and Kd=20. In FIG. 5a, there is a graphic illustration of time measured in seconds versus brake pedal position. When a vehicle is a drive mode and the brake pedal is fully depressed by an operator or the brake pedal is ON the target creep speed is zero mph, as shown in FIG. 5b. and the vehicle is stationary.

As the brake pedal is released by the operator, the target creep speed increases to three mph followed by the vehicle acceleration to that speed with a slight overshoot. In FIG. 5c, as the operator releases the brake pedal the requested wheel torque exceeds 400 Nm to accelerate the vehicle from the brake ON mode to the brake OFF mode. After a short period or a few seconds, then the wheel torque reduces to 26 Nm.

In FIG. 5a, at the fifteen seconds position the operator has almost totally released the brake pedal, which decreases the brake position. The brake position stays at the decreased level as the operator continues to release the brake pedal until the operator fully depresses the brake pedal, then the brake position increases to 1.

In FIG. 5b, at the fifteen seconds position the vehicle speed and the target creep speed has decreased to about 1.5 mph. The target speed and vehicle speed will remain in this range until the operator fully depresses the brake pedal, then the target speed and creep speed will decrease to zero mph. In FIG. 5c, at the fifteen seconds position the required wheel torque decreases below zero for a short period of time, to decelerate the vehicle, then rises back to 26 Nm. At the twenty-five seconds position, the operator fully depresses the brake pedal, then the requested speed goes to zero and the vehicle comes to a stop. The requested wheel torque also goes to zero. The wheel torque figures, described above, are purely illustrative and will depend on vehicle characteristics as well as road grade.

Referring to FIG. 4, by setting the Integral or the Derivative gains to zero other standard controller forms of Proportional+Derivative (PD) or Proportional+Integral (PI) can be constructed. Even though the PID controller is the most commonly used algorithm, other algorithms, as described above, may also be employed to correct the error signal. A delta feedback term can always use an error signal with any algorithm as a means to correct the error signal.

In 211, the torque correction is added to the request for wheel power or wheel torque. In 213, the request for wheel power is limited for safety reasons, for driver feel/comfort, and to meet the physical limitations of the engine 101 and motor 114. This limit includes a maximum amount of wheel torque that can be commanded when in creep mode, and a maximum rate of change that is allowed when the calculated torque is increasing (not decreasing). This wheel torque may be adjusted based on the preference of the driver or the automobile, such as weight of car, road slope etc.

In 215, the creep mode is calculated, and then the request for wheel torque is transmitted to the actuators operatively connected to engine 101 in a conventional vehicle. Alternatively, the request for wheel torque is transmitted through the actuators to engine 101 and motor 114 in a hybrid vehicle. Engine 101 and/or motor 114, upon receiving the request for wheel torque, produces the wheel torque, which is transmitted to the transmission 104. Transmission 104 receives the wheel torque, and then transmission 104 transfers the wheel torque to the plurality of wheels 106a. When the plurality of wheels 106 receives the wheel torque, then the wheels move in a creep like manner.

The operator or vehicle may choose to re-initiate creep mode to recalculate the creep mode. If the operator chooses to re-initiate the creep mode, then the process returns to 203.

If the operator chooses to keep the vehicle in the calculated creep mode, then the process goes to 217. If the vehicle has completely stopped, it will enter another mode, such as an engine ON/vehicle stopped mode or an engine OFF/vehicle stopped mode. If the person's foot is off the brake pedal and the vehicle speed is high, or if the accelerator is pushed, then the vehicle will enter a normal drive mode.

Thus it is intended that the foregoing detailed description be regarded as illustrative rather than limiting and that it be understood that it is the following claims, including all equivalents, which are intended to define the scope of the invention.

We claim:

1. A method for controlling vehicle creep control, the method comprising:
   receiving measurements from a brake pedal sensor, wherein the measurements are indicative of a brake pedal travel;
   deriving a target creep speed value based on measurements of creep speed and the brake pedal travel;
   deriving a request for wheel torque based on the target creep speed value;
   determining if there is a difference between a measurement of vehicle creep speed and the target creep speed value; and
   adjusting the request for wheel torque, if the target creep speed is not equivalent to the vehicle creep speed.

2. The method of claim 1 further comprising adding a torque correction to the request for wheel torque.

3. The method of claim 1 wherein the step of deriving a target creep speed further comprises using a software program.

4. The method of claim 3 further comprising matching the brake pedal travel with the measurements of creep speed of the software program.

5. The method of claim 1 wherein the step of deriving the request for wheel torque further comprises the utilization of a software program.

6. The method of claim 5 wherein the software program further comprises a look-up table that includes measurements of the target creep speed that can be matched with a value of the request for wheel torque.

7. The method of claim 1 wherein the vehicle creep speed is subtracted from the target speed to determine the difference between the vehicle speed and the target speed.

8. The method of claim 7 wherein said step of adjusting the wheel to torque further comprises utilizing a control method.

9. The method of claim 8 wherein a PID controller is the control method utilized to adjust the request for wheel torque.

10. The method of claim 8 wherein a PI controller is the control method utilized to adjust the request for the wheel torque.

11. The method of claim 8 wherein a sliding mode algorithm is the control method utilized to adjust the request for the wheel torque.

12. The method of claim 8 wherein a phase advance algorithm is the control method utilized to adjust the request for the wheel torque.

13. The method of claim 2 further comprising the step of transmitting the adjusted request for wheel torque to an engine.

14. The method of claim 13 wherein the engine is an internal combustion engine.

15. The method of claim 13 further comprising the step of transmitting the adjusted wheel torque to a transmission.

16. The method of claim 15 further comprising the step of transmitting the adjusted wheel torque to a plurality of wheels.

17. The method of claim 2, further comprising transmitting the adjusted wheel torque to an engine and a motor.

18. The method of claim 17 further comprising transmitting the adjusted wheel torque to a transmission.

19. The method of claim 18, further comprising transmitting the adjusted wheel torque to a plurality of wheels.

20. A method for controlling vehicle creep control, the method comprising:
    receiving measurements from a brake pedal sensor, wherein the measurements are indicative of a brake pedal travel;
    deriving a target creep speed value based on the measurements of creep speed and the brake pedal travel;
    deriving a request for wheel power based on the target speed;
    determining if there is a difference between a vehicle creep speed and the target creep speed value; and
    adjusting the request for wheel power, if the target creep speed is not equivalent to the vehicle creep speed.

21. A system for controlling creep speed in a vehicle, the system comprising:
    a plurality of wheels in the vehicle operatively connected to a transmission;
    an engine operatively connected to the transmission;
    a controller operatively connected to the engine, wherein the controller receives measurements from a brake pedal of the vehicle and a speedometer of the vehicle, wherein the controller compares the measurements with a software program, and based on the measurements and the software program requests wheel torque be applied to the plurality of wheels to drive the vehicle.

22. An apparatus for controlling vehicle creep control, the apparatus comprising:
    means for receiving measurements from a brake pedal sensor, wherein the measurements are indicative of a brake pedal travel;
    means for deriving a target creep speed value based on the measurements of creep speed and the brake pedal travel;
    means for deriving a request for wheel torque based on the target speed;
    means for determining if there is a difference between a vehicle creep speed and the target creep speed value; and
    means for adjusting the request for wheel torque, if the target creep speed is not equivalent to the vehicle creep speed.

23. An apparatus for controlling creep of a vehicle, the apparatus comprising:
    a controller configured to receive measurements from a brake pedal indicative of a travel of the brake pedal, wherein the controller compares the measurements with a software program and based on the measurements and the software program requests wheel torque be applied to a plurality of wheels to drive the vehicle.

* * * * *